United States Patent [19]
Weber

[11] Patent Number: 5,705,110
[45] Date of Patent: Jan. 6, 1998

[54] PROCESS FOR REDUCING CROSS LINK VAPORS FROM ROTOMOLDED PRODUCTS MADE OF CROSS LINK POLYETHLYLENE

[75] Inventor: Brian M. Weber, Robins, Iowa

[73] Assignee: Centro Incorporated, North Liberty, Iowa

[21] Appl. No.: 709,989

[22] Filed: Sep. 9, 1996

[51] Int. Cl.$^6$ .................................................. B29C 41/04
[52] U.S. Cl. ............................. 264/83; 264/310; 264/311
[58] Field of Search ........................ 264/83, 310, 311

[56] References Cited

U.S. PATENT DOCUMENTS

| | | |
|---|---|---|
| 3,227,605 | 1/1966 | Wolinski . |
| 3,439,079 | 4/1969 | McDowell ........................ 264/310 |
| 4,115,508 | 9/1978 | Hughes ............................ 264/310 |
| 4,666,650 | 5/1987 | Carrow ........................... 264/310 |
| 4,857,257 | 8/1989 | Chen ............................... 264/310 |
| 4,863,687 | 9/1989 | Stevens et al. . |
| 5,186,903 | 2/1993 | Cornwell . |
| 5,264,640 | 11/1993 | Platz . |
| 5,368,816 | 11/1994 | Detzer . |
| 5,492,657 | 2/1996 | Danschikov ....................... 264/83 |

FOREIGN PATENT DOCUMENTS

| | | | |
|---|---|---|---|
| 4222645 | 1/1994 | Germany | ................ 264/83 |

OTHER PUBLICATIONS

Kircher, Klaus "Chemical Reactions in Plastics Processing", Macmillan Publishing Company, 1987.
Rotational Molding, Association of Rotational Molders, Oak Brook, Illinois, 1990.

*Primary Examiner*—James Derrington
*Attorney, Agent, or Firm*—Allan L. Harms

[57] ABSTRACT

A method to reduce cross link vapors trapped in hollow cross link polyethylene products produced by rotomolding is disclosed. Ozone is introduced into the hollow product after the polymer has cross linked. Compressed air is delivered with the ozone to circulate the ozone effectively. Use of the ozone oxidizes the cross link vapors and permits reduction in stored inventory of units awaiting dissipation of the cross link polyethylene vapors. A system for batch treatment of the products is also disclosed.

24 Claims, 1 Drawing Sheet

PROCESS FOR REDUCING CROSS LINK VAPORS FROM ROTOMOLDED PRODUCTS MADE OF CROSS LINK POLYETHLYLENE

BACKGROUND OF THE INVENTION

This invention relates to the manufacture of rotomolded products from cross link polyethylene. Finely granulated polyethylene and a cross linking agent are introduced into a mold and the mold is then heated while it is rotated simultaneously about two axes. The polyethylene is acted upon by the cross linking agent to create a cross linked molecule. The cross link polyethylene coats the inside of the mold and the mold is continuously rotated biaxially as the cross link polyethylene iscured into the desired product shape.

The unit removed from the mold is a hollow enclosure having at least one opening through the wall thereof. As the unit is handled, extremely pungent cross link vapors escape from the unit and are irritating to the skin, nasal passages, and eyes of the unit handler. Typically units are stored for 72 hours to allow the cross link vapors to dissipate into the atmosphere. This results in a concentration of pungent vapors around the storage areas, especially in winter periods when ventilation of the facility is limited. The vapors include acetophenone and methane. Acetophenone is especially pungent. Other chemical vapors generated in the rotomolding of cross link polyethylene are: Methyl ethyl ketone, Acetone, Cyclohexanone, Diisobutyl Ketone, Methyl Isobutyl Ketone, Methyl n-Amyl Ketone, Ethyl Butyl Ketone, Acetaldehyde, Butyraldehyde, Isobutyraldehyde, Formaldehyde, Hexanol.

The known method of dealing with these vapors is through plugging the openings of the units during removal from the molds, followed by vacuum pumping from the units into the atmosphere, followed by extended storage.

SUMMARY OF THE INVENTION

A process for reduction in cross link vapors generated in the rotomolding of products made of cross link polyethylene is disclosed. Following molding of the cross link polyethylene product in the usual way, a mixture of ozone and compressed air is introduced into the interior of the newly molded product. The contents of the unit are pumped out into the atmosphere during or immediately after the introduction of the ozone/compressed air mixture. The unit may then be moved to shipping or finished goods storage without the continued escape of undesirable pungent odors. The compressed air is used as a dispersant for the ozone in order to circulate the ozone within the molded unit. The ozone breaks down the acetone, formaldehyde and methylethylketone compounds into carbon dioxide, water and oxygen. Ozone will partly break down other compounds generated in the rotomolding facility as follows: 2-Pentanone, Camphor, 5-Methyl 3-Heptanone, 2-Cloroethanol, 1-Chloro 2-Propanol, 2-Chloro 1-Propanol, 3-Chloro 1-Propanol, 3-Chloro 1-Propanediol, 3-Chloro 2-Propanediol, Heptanol.

In the preferred embodiment, a control unit is provided to selectively introduce the ozone and compressed air mixture into one or more molded units for a predetermined time. The control unit activates an ozone generator and air compressor and after a predetermined delay activates valves to pass the ozone/air mixture into each unit for a predetermined time. Once treated, the units may be moved to finished goods storage or to other work stations for additional manufacturing operations if appropriate.

It is an object of the invention to provide a process for reduction in noxious vapors present in cross linked polyethylene products produced in a rotomolding process.

It is a further object of the invention to provide a method for reducing the quantity of cross link vapors in the environment of the molding facility.

It is a further object of the invention to reduce the incidence of worker illness and health problems from exposure to cross link vapors produced in the rotomolding process.

It is a further object of the invention to provide a process which reduces the need for storage space for rotomolded products made from cross link polyethylene.

It is a further object of the invention to provide an inexpensive, safe process for significantly reducing cross link vapors from rotomolded cross link polyethylene.

These and other objects of the invention will become apparent from the detailed description which follows.

DESCRIPTION OF THE DRAWING FIGURES

FIG. 1 schematically illustrates the preferred embodiment of the invention process wherein ozone and compressed air are injected into a newly rotomolded workpiece while a vacuum pump creates suction to evacuate the workpiece.

FIG. 2 schematically illustrates an alternative embodiment of the process invention wherein a control unit having timer and control valves activates an ozone generator and air compressor and then controls introduction of an ozone and compressed air mixture into each of three workpieces for a selected interval while an exhaust line draws the gaseous contents from within each of the three workpiece units.

DETAILED DESCRIPTION

Figure 1:
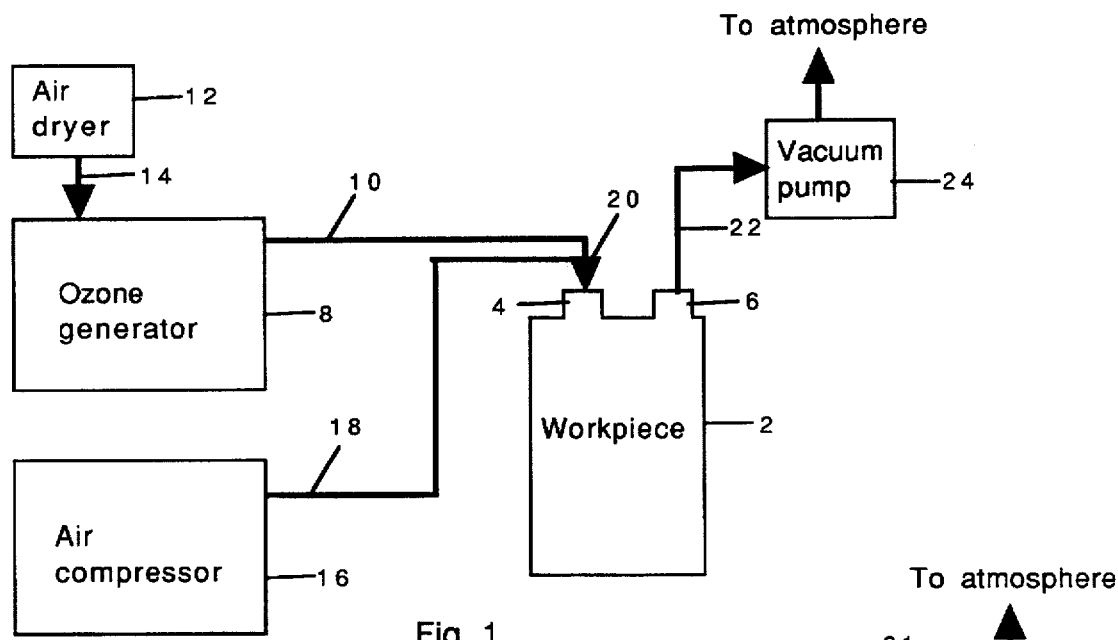

This invention utilizes the powerful oxidizing agent ozone to oxidize malodorous and pungent gases which are formed as byproducts of the rotomolding of polymer products from cross link polyethylene resin. A thorough discussion of the rotomolding methodology may be found in *Rotational Molding. The Introductory Guide to Designing Rotationally Molded Plastic Parts*, published by the Association of Rotational Molders, Oak Brook, Ill., copyright 1982,1990, which is herein incorporated by reference. A discussion of the properties of cross link polyethylene may be found in *Chemical Reactions in Plastics Processing* by Klaus Kircher, published by Hanser Publishers, copyright 1987, distributed by MacMillan Publishing Co., New York, N.Y., which is also incorporated herein by reference.

Hollow polymer parts such as fuel tanks are formed by the rotomolding of a powdered mixture of polyethylene resin and a free radical generator (cross linking agent) which is heated during biaxial rotation to a temperature at which cross linking of the polyethylene occurs. The mixture of polyethylene and free radical generator is herein referred to as cross link polyethylene.

The polyethylene cross links through reaction with the free radicals released by the cross linking agent and cures and solidifies upon the interior walls of the mold to form a hollow body. The mold is then cooled before the body is released from the mold.

The molding of cross linked polyethylene introduces many chemical compounds into the air we breathe. These compounds are irritating to the skin, nose, and eyes. Sampling of the air around rotomolding machines has found twenty-six chemical compounds attributable to the rotomolding of cross link polyethylene. Of the twenty-six chemical compounds in the air attributed to cross link vapor, ozone completely breaks down twelve, namely, Methyl ethyl ketone, Acetone, Cyclohexanone, Diisobutyl Ketone, Methyl Isobutyl Ketone, Methyl n-Amyl Ketone, Ethyl Butyl Ketone, Acetaldehyde, Butyraldehyde, Isobutyraldehyde, Formaldehyde, Hexanol; and partially breaks down ten of those compounds, namely 2-Pentanone, Camphor, 5-Methyl 3-Heptanone, 2-Cloroethanol, 1-Chloro 2-Propanol, 2-Chloro 1-Propanol, 3-Chloro 1-Propanol, 3-Chloro 1-Propanediol, 3-Chloro 2-Propanediol, Heptanol; has no affect on two: 2-Hexanone, Mesityl Oxide; and it is unknown if ozone affects the remaining two compounds: Furfural, Valeraldehyde.

Ozone is a chemical compound that has a charge, or valence electron configuration. In the earth's atmosphere, ozone is produced when oxygen is exposed to either ultraviolet light from the sun or an electrical charge. Ozone's primary function in nature is to purify the air we breathe and to screen us from the sun's harmful rays. Ozone can also be produced mechanically, and is one of the most powerful oxidizing agent commercially available. Corona discharge type ozone generators manufacture ozone in a generator by taking dry air (−70° F. dew point) and exposing it to a high frequency electrical charge. This causes oxygen molecules ($O_2$) in the dry air to disassociate and reassemble as ozone ($O_3$). Other ozone generation devices are well known in the art.

Ozone, also called trivalent oxygen, must be continually renewed. The half-life of ozone is only fifteen minutes in a non-reactive environment. When ozone is used as an oxidizing agent, it will revert back to oxygen during the reaction; therefore the ozone produced will not require a recapturing system.

Organic compounds, such as cross link vapor, react with ozone ($O_3$) in a process similar to combustion. The reaction of an organic compound with ozone yields carbon dioxide and water as the main end-products. Ozone will completely breakdown formaldehyde, acetone, hexanol, and all of the ketone compounds, as outlined by the following reactions.

Acetone $C_3H_6O+8O_3 \rightarrow 3CO_2+3H_2O+8O_2$

Formaldehyde $HCHO+2O_3 \rightarrow CO_2+H_2O+2O_2$

Methyl-Ethyl Ketone $CH_3COC_2H5+11O_3 \rightarrow 4CO_2+4H_2O+11O_2$

One concern with respect to introducing ozone into facility air is the exposure of the plant workers breathing ozone. According to the Environmental Protection Agency (EPA), ozone is safe to breathe for eight hours at concentrations below 200 parts per billion. The material safety data sheet for ozone confirms the EPA's guidelines. To insure this limit is not exceeded, a monitoring device is recommended.

Referring now to the figures, wherein identical elements are identified by like numbers, and in particular to FIG. 1, a workpiece 2 has been removed from the rotomolding machine, having been formed as a hollow enclosure by the molecular cross linking of powdered cross link polyethylene within an enclosing mold which is rotated about at least two axes within an oven at 300°–600° F. and then cooled with the polymer conforming to the interior of the mold. An exemplary cross link polyethylene for such processing is type F cross link polyethylene from Paxon Polymer Company of Baton Rouge, La., The quantity of resin placed in the mold results in the production of a thin-walled workpiece 2 which is provided typically with at least one port 4 and may have additional ports such as second port 6. Because cross link polyethylene rotomolded parts are frequently used as liquid storage tanks, port 4 and second port 6 will be molded as a part of workpiece 2 during the rotomolding process. After molding, workpiece 2 typically contains a mixture of cross link vapors which include: Methylethylketone, Acetone, Cyclohexanone, Diisobutyl Ketone, Methyl Isobutyl Ketone, Methyl n-Amyl Ketone, Ethyl Butyl Ketone, Acetaldehyde, Butyraldehyde, Isobutyraldehyde, Formaldehyde, Hexanol, 2-Pentanone, Camphor, 5-Methyl 3-Heptanone, 2-Cloroethanol, 1-Chloro 2-Propanol, 2-Chloro 1-Propanol, 3-Chloro 1-Propanol, 3-Chloro 1-Propanediol, 3-Chloro 2-Propanediol, and Heptanol.

An ozone generator capable of producing from one to six grams per hour of ozone is provided, having a duct 10 which enters port 4 such that ozone from ozone generator 8 will be introduced into the interior of hollow workpiece 2. An air dryer 12 is preferably used when dry air is not available to supply ozone generator 8 since the ozone generator 8, preferably of the corona discharge type, will work most efficiently when supplied with air having a dew point of −70° F. Dried air leaves air dryer 12 and passes through dry air duct 14 to ozone generator 8.

An air compressor 16 having a capacity to compress air to at least 90 psi is provided with hose 18 or other suitable ducting to deliver compressed air to port 4 of workpiece 2. A nozzle 20 may be employed to introduce compressed air into workpiece 2 at the approximate rate of twenty-three standard cubic feet per minute. Ozone from duct 10 may be drawn into the stream of compressed air coming from air compressor 16 at or near nozzle 20. The compressed air is used to propel and disperse the ozone as it enters workpiece 2. The ozone and compressed air supply may be discontinued as the cross link vapors present in the workpiece 2 have been oxidized into predominantly $CO_2$, $H_2O$ and $O_2$. A lance line 22 is placed in the interior of workpiece 2 such that vacuum pump 24 may draw the gases from interior of workpiece 2 and vent any excess $O_3$ and the resultant oxidation products into the outside atmosphere. It is to be understood that activation of ozone generator 8 and air compressor 16 may be done manually by an operator who also may provide ducts 10 and 18 to workpiece 2 and insert nozzle 20 within port 4. The operator may also manually place lance line 22 in workpiece 2, through second port 6 or if necessary, through port 4. It is found that an ozone generator capable of generating ozone at the rate between two and six grams per hour, preferably 2.8 grams per hour, will suffice to provide necessary ozone to oxidize the cross link vapors of a tank of approximately 100 gallon capacity when it is supplied with 90 psi compressed air for a period of from one half to twenty minutes, preferably about one minute. The rate that ozone is supplied and the time period ozone treatment is applied will depend on the size of the rotomolded product to be treated.

Figure 2:
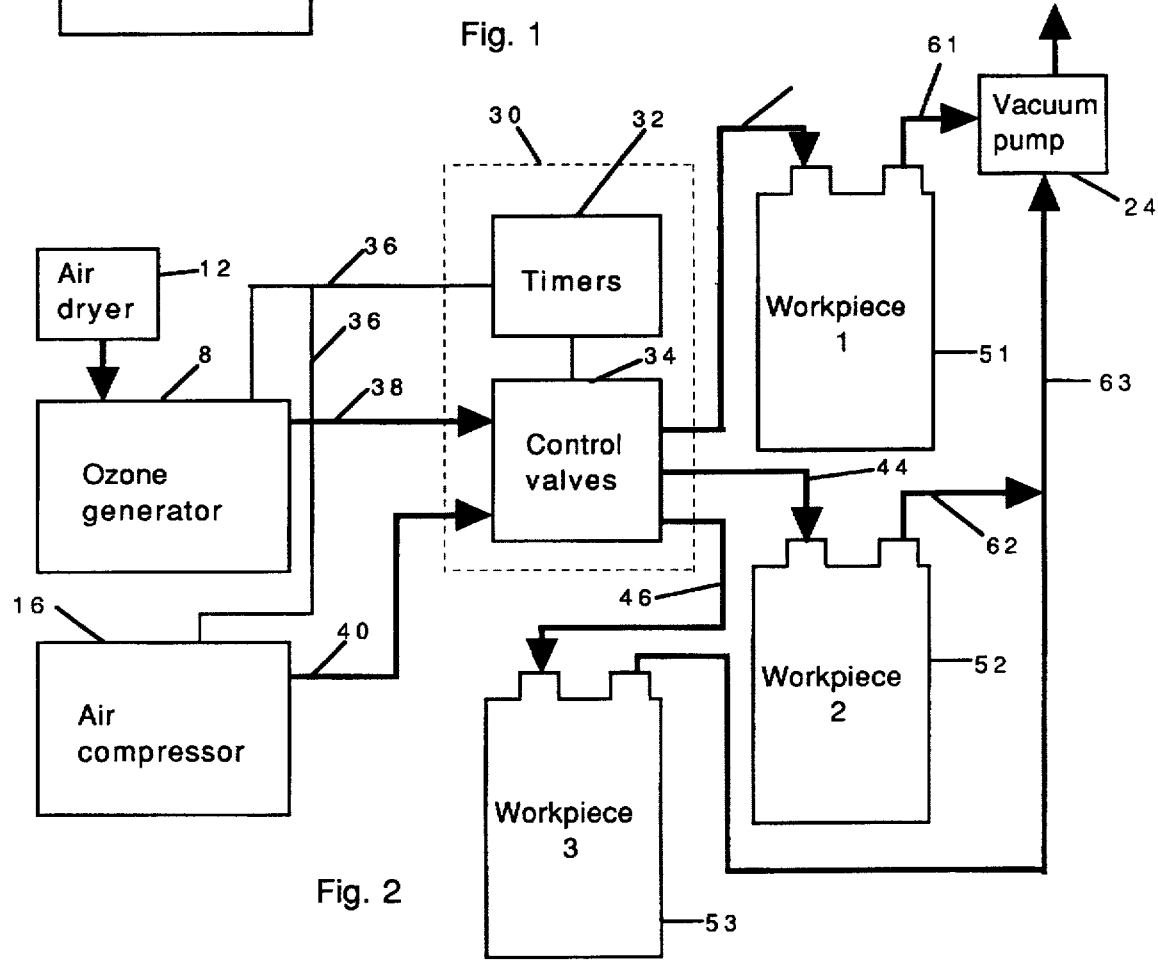

FIG. 2 discloses a schematic of a semiautomatic apparatus for treatment of up to three workpieces at a time to reduce the cross link vapors contained within the workpieces upon their removal from the molds of a cross link polyethylene rotomolding machine.

Air dryer 12 provides dry air to ozone generator 8 as required. Controller 30, designated by a dashed lined enclosure, includes timers 32 and control valves 34. Timer 32 is electrically coupled by wiring 36 to control ozone generator 8 and air compressor 16 to operate as needed to produce ozone and to provide a source of compressed air. Suitable ducts 38 and 40 couple ozone generator 8 and air compressor 16 to control valves 34 which cause the ozone to be injected into the compressed air stream and to automatically direct flow of the ozone/compressed air mixture to one or more of workpieces 51, 52 and 53 for a predetermined time. An operator must manually install hoses 42, 44, and 46 into workpieces 51, 52, and 53 respectively and after activating control unit 30, the operator may carry out other duties and return after one minute or more to remove hoses 42, 44, and 46 and exhaust lines 61, 62, and 63 from workpieces 51, 52, and 53 respectively, and then remove the workpieces to finished goods storage, then replacing them with other newly molded workpieces. The controller 30 permits the operator to select whether one, two or three workpieces will be treated in any given batch.

The step in the rotomolding process when the workpiece is exposed to ozone may be advantageously after the workpiece is removed from the mold. However, the cross link vapors to be oxidized are present once curing and cross linking of the polyethylene resin commences. Therefore, ozone exposure to the workpiece may be accomplished once the polyethylene is cross linked and the hollow workpiece is formed, whether that is within the oven, within the cooling station, or after the cooling. The methodology of introduction of ozone into the workpiece depends on necessary equipment modifications which are contemplated in this disclosure as set out in the example below.

EXAMPLES

Hollow parts molded in a rotomolding machine from cross link polyethylene resin such as type F cross link polyethylene resin from Paxon Polymer Company of Baton Rouge, La., were used for evaluation. After researching different ozone generators available, a Clearwater Tech M1500™ corona discharge ozone generator manufactured by Clearwater Tech, Inc. of San Luis Obispo, Calif., was purchased. The intake side of the machine must receive cool dry air. Any moisture in the feed gas will reduce the performance of the ozone generator. A pressure swing air dryer able to produce up to ten liters per minute of air at a dew point of −70° F. was also purchased. The air from the air dryer is fed into the corona discharge ozone generator.

Initially, the ozone generator was used on a McNeil 800™ rotomolder (from McNeil & NRM, Akron, Ohio) that was running four Donaldson™ intake adapter molds (Donaldson Co., Inc., Minneapolis, Minn.) on one arm, and all of these molds had internal air lines running into the mold. The ozone generator's output line was coupled to the internal air line using a T-fitting. The internal air was also being used to operate the brakes for the arm. The ozone generator was activated only after the molds left the oven and entered the cooling chamber. Ozone was introduced to the four molds for sixteen minutes, then turned off when the cooling chamber doors opened. The results were very encouraging. Four test parts were cut immediately after they were removed from the mold; no intense odor, or vapor to cause tearing of the eyes was noticed. Each of the pads had small pock marks distributed on the inside surface of the part, which might suggest the ozone had some effect on the cure of the part. These pans were then tested for impact strength. All of the parts passed 60 ft.-lbs but reached ductile failure at 80 ft.-lbs. These results are consistent with non-ozone treated parts, indicating no effect on physical properties. The pock marks were not noticed on later tests.

The second test was done on the prototype machine where the ozone could be delivered into the mold without being contaminated with compressed air. A test mold was attached to an arm of the prototype machine, and cross link polyethylene resin was the test material. For this experiment, one part was run with the ozone injected into a pad while in the oven, and ozone was injected into a different part while in the cooling chamber. Only the part run with ozone being introduced while in the cooling chamber had a decrease in the cross link vapors. This observation indicated that the cross link vapors are not affected by ozone while the part is in the oven. As in the first experiment, this test showed promising results of reducing cross link vapor; however, the internal air passages leaked so severely on the prototype machine, only a small mold could be used due to the drop in ozone volume being delivered to the mold.

A third test was performed on the prototype machine utilizing a test mold and control mold, which were the same part on the same arm. Ozone was introduced into the test mold only, the ozone generator was switched on when the arm entered the cooling chamber, then switched off as the arm exited the cooling chamber. The results were not as pleasing. Although the odors emanating from the test part and the control part were different, both odors were irritating to the eyes and nose. Puzzled by this phenomenon, after two previous successful trials, an investigation showed that the ozone gas exiting the machine arm had mixed or reacted with hot grease leaking into the inner air passageway and was now irritating to the eyes and nose.

The fourth test was set-up on a Ferry 220™ production rotomolding machine manufactured by Ferry Industries, Inc. of Stow, Ohio. This test would eliminate the effects of the leaking grease found on the prototype machine test because the Ferry's arm had been recently rebuilt. The test would also show if the ozone was acting as a purge gas and simply displacing the cross link vapors, or indeed reacting with the cross link gas. The Ferry 220™ machine was set up to run a test and a control mold was attached. When the parts came out of the cooling chamber, a sniff test was performed on the vapors coming out of the ozonated part and the gas was not irritating to the nose; the vapor from the non-ozonated part was irritating to the nose and eyes. The next cycle was run with dry air instead of ozone, at the same rate of flow (ten liters per minute) as the ozone, and the parts were again sniffed. The results indicate that the ozone did react with the cross link vapors because the part run using dry air produced irritating cross link vapors.

In order to evaluate the chemical reactions taking place and the effects those reactions have on the polymerization process, twenty-two 5"×5" plaques of natural cross link polyethylene were submitted to ozone in the cooling chamber. These samples were tested against twenty-two plaques of natural cross link polyethylene from the same mold, but not subjected two ozone gas.

Four separate tests were planned to evaluate the material's property changes. The ARM Impact test indicates the material's ability to resist high rate loading. Impact data is widely used as an indicator of a material's strength. The Environmental Stress Crack Resistance test, or ESCR, would examine the change in the material's ability to resist chemical reagents. This test is quite important because of cross link polyethylene's use in fuel tanks and other chemical storage tanks. An infrared scan test called FTIR scan would be used to forecast the types of chemical bonds that form, giving an indication of strength and molecular changes that might take place.

The preliminary results indicate that ozone has no detrimental effects on the material.

The *Handbook of Ozone Technology and Applications* was used to research recent experimental studies dealing with corrosion and degradation of materials in ozone-containing environments. The authors noted that for non-metallic materials, ozone exposure tends to change the internal structure of the material slightly, similar to what occurs during the aging of plastics and rubbers. The results showed a slight increase in hardness and no significant change in ultimate tensile strength when type F polyethylene was exposed to ozone in the vapor phase for periods from 86 to 187 days. These results concur with preliminary test results.

It was discovered that it could be very costly to retrofit every machine for dual air passages and extremely complicated to run ozone into every cross link part while in the cooling chamber. For this reason, other techniques were explored. When ozone is pumped into a part immediately after demolding, the part has significantly less cross link vapor. One method of introducing ozone into large fuel tanks could be to modify the lance line system currently used on the Ferry 280 rotomolding machine. The ozone can be delivered into a fuel tank through one tube, then the byproducts of the reaction along with the excess ozone would be evacuated by the lance line.

The drawback to introducing ozone into a part outside of the machine is the increased risk of exposure to the operators. However, this exposure risk appears to be manageable with a properly engineered system of introduction. According to studies done by the EPA, ozone is safe to breathe at levels below 200 ppb for eight hour shifts, but concentrations above 200 ppb can cause lung irritation. In a plant which has approximately 940,000 cubic feet of space, it would take a tremendous amount of ozone gas to bring the ozone concentration up to dangerous levels. As a precaution, an ozone monitoring system should be installed at the work area to monitor the concentration of the ozone.

Small tubing may be run from the ozone generator to each of the lance lines for use on the workpieces. If desired, an ozone monitor may be used to monitor $O_3$ levels in the work area. The investment will potentially reduce the amount of floor space used for work in progress storage because fuel tanks will not need to vent for three days before finishing. This investment will also potentially reduce the cross link odor at the work station as well as throughout the molding facility.

Having described the invention, I claim:

1. In a rotomolding system operated in accordance with the method comprising the steps of introducing a powdered mixture of polyethylene and free radical generator into a hollow mold, biaxially rotating the mold in an oven, heating the mold sufficiently to cross link the polyethylene, curing and solidifying the cross linked polyethylene into a hollow body, removing the mold from the oven to a cooling station, cooling the mold, opening the mold to withdraw the hollow body from the mold, the improvement comprising the steps of introducing ozone into the hollow body after tho polyethylene begins to cure whereby the cross link vapors generated arc reduced.

2. The rotomolding process of claim 1 wherein said ozone is introduced into the hollow body after the mold is removed from the oven.

3. The rotomolding process of claim 1 wherein said ozone is introduced into the hollow body after the body is removed from the mold.

4. The rotomolding process of claim 1 wherein said ozone is introduced at the rate of between 2 and 6 grams per hour.

5. The rotomolding process of claim 1 wherein a stream of compressed air is introduced into said hollow body coincident with introduction of said ozone.

6. The rotomolding process of claim 5 wherein said ozone is injected at the rate of between 2 and 6 grams per hour.

7. The rotomolding process of claim 1 wherein said ozone is injected at the rate of approximately 2.8 grams per hour per one hundred gallon volume within the hollow body.

8. The rotomolding process of claim 7 wherein a stream of compressed air is introduced into said hollow body coincident with introduction of said ozone.

9. The rotomolding process of claim 8 wherein said stream of compressed air is delivered at a pressure of approximately 90 p.s.i.

10. The rotomolding process of claim 8 wherein said stream of compressed air is introduced into said body by a nozzle affixed to a hose, said ozone is drawn into said stream of compressed air at said nozzle.

11. The rotomolding process of claim 10 wherein said stream of compressed air and said ozone are controlled by an automated controller.

12. The rotomolding process of claim 11 wherein said automated controller first activates an ozone generator and then activates an air compressor, said automated controller opens a valve in said air stream at a predetermined delay interval, said automated controller closes a valve in said air stream after a predetermined time interval.

13. A method to produce a molded form from cross link polyethylene comprising the steps of introducing a mixture of powdered polyethylene resin and a cross linking agent into a hollow mold, biaxially rotating the mold in an oven, heating the mold sufficiently to cause the resin to be cross linked, curing and solidifying the cross linked polyethylene into a form, exposing the form to ozone for a predetermined time whereby the vapors generated by cross linking are reduced.

14. The method of claim 13 wherein the ozone is introduced into the form at a rate of from one to three grams per hour per one hundred gallons of space within the form.

15. The method of claim 13 wherein the ozone is introduced into the form at a rate of approximately 2.8 grams per hour per one hundred gallons of space within the form.

16. The method of claim 13 wherein said mold is removed from the oven before said form is exposed to ozone.

17. The method of claim 13 wherein a stream of compressed air is introduced into the form while the form is exposed to the ozone.

18. The method of claim 17 wherein the ozone is introduced into the form at a rate of two to six grams per hour per one hundred gallon volume within the form.

19. The method of claim 17 wherein the stream of compressed air is pressurized to approximately 90 psi.

20. The method of claim 17 wherein the ozone is introduced into the stream of compressed air before the compressed air is introduced into the form.

21. A method of reducing malodorous oxidizable gaseous byproducts generated in the forming of a hollow workpiece from a powdered mixture of polyethylene and free radical generator in molds carried in a rotomolding apparatus, the workpiece having an interior space, comprising introducing ozone into said interior space of said workpiece.

22. The method of reducing malodorous oxidizable gaseous byproducts of claim 21 wherein
said ozone is introduced into said interior space of said workpiece after said workpiece is removed from said rotomolding apparatus.

23. The method of reducing malodorous oxidizable gaseous byproducts of claim 21 wherein
said ozone is introduced at the rate of between 1 and 6 grams per hour per one hundred gallon volume within said workpiece.

24. The method of reducing malodorous oxidizable gaseous byproducts of claim 21 wherein
compressed air is introduced into said hollow workpiece coincident with introduction of said ozone.

* * * * *